(12) United States Patent
Gerrard

(10) Patent No.: US 7,168,719 B2
(45) Date of Patent: Jan. 30, 2007

(54) VEHICLE SUSPENSION

(75) Inventor: Miles Barnaby Gerrard, Bolton (GB)

(73) Assignee: Randle Engineering Solutions Limited, Warwick (GB)

( * ) Notice: Subject to any disclaimer, the term of this patent is extended or adjusted under 35 U.S.C. 154(b) by 0 days.

(21) Appl. No.: 09/979,372

(22) PCT Filed: May 16, 2000

(86) PCT No.: PCT/GB00/01882

§ 371 (c)(1),
(2), (4) Date: Mar. 15, 2002

(87) PCT Pub. No.: WO00/71369

PCT Pub. Date: Nov. 30, 2000

(65) Prior Publication Data

US 2004/0212167 A1    Oct. 28, 2004

(30) Foreign Application Priority Data

May 20, 1999   (GB) ................................. 9911633.7

(51) Int. Cl.
*B60G 3/20* (2006.01)
(52) U.S. Cl. ..................... 280/124.135; 280/124.104; 280/124.138; 280/124.143; 280/124.15
(58) Field of Classification Search ......... 280/124.135, 280/124.138, 124.139, 124.141, 124.142, 280/124.143, 124.145, 124.148, 124.15, 280/124.104
See application file for complete search history.

(56) References Cited

U.S. PATENT DOCUMENTS

| 4,440,419 | A | * | 4/1984 | Kosak et al. | ......... 280/124.128 |
| 4,815,755 | A | * | 3/1989 | Takata et al. | ......... 280/124.128 |
| 4,863,188 | A | * | 9/1989 | Killian | ................ 280/124.138 |
| 5,380,035 | A | * | 1/1995 | Lee | ..................... 280/124.143 |
| 5,415,427 | A | * | 5/1995 | Sommerer et al. | .... 280/124.135 |

FOREIGN PATENT DOCUMENTS

| EP | 0 338 547 | 10/1989 |
| GB | 773 672 | 5/1957 |
| GB | 845 571 | 8/1960 |
| GB | 2 208 630 | 4/1989 |
| GB | 2 246 329 | 1/1992 |
| GB | 2 270 508 | 3/1994 |
| GB | 2 277 303 | 10/1994 |

\* cited by examiner

*Primary Examiner*—Eric Culbreth
(74) *Attorney, Agent, or Firm*—Renner, Kenner, Greive, Bobak, Taylor & Weber

(57) ABSTRACT

A suspension system is disclosed which controls the movement of a wheel carrier relative to the body of a vehicle. The suspension system includes one or more links (10, 20, 30, 40) connected at one end to the wheel carrier and at the other end to the vehicle body as to define a linkage. The linkage is so constructed and arranged that the stiffness or reaction of the suspension to longitudinal forces applied at the wheel contact patch is greater than the stiffness or reaction of the suspension to longitudinal forces applied substantially at the axis of rotation of the wheel.

14 Claims, 2 Drawing Sheets

VEHICLE SUSPENSION

TECHNICAL FIELD

This invention relates to improvements in vehicle suspension systems, especially but not exclusively for wheeled road vehicles.

BACKGROUND OF THE INVENTION

In order to improve the ride quality of a vehicle, such as a road vehicle, it is well known that the vehicle body including the passenger carrying compartment should be isolated from the road wheels by a suspension system.

In known vehicles, it is conventional that the vehicle is provided with a number of road wheels. Typically four are provided on a passenger vehicle—although more may be provided on vehicles such as coaches or heavy goods vehicles. Each wheel supports a rubber road tyre which engages the road surface to form a "contact patch" at the circumference of the tyre. The wheel is supported by a wheel carrier and rotates around an axis passing through the wheel carrier which is perpendicular to the plane of the wheel and the direction of rotation of the wheel.

For the sake of clarity of description, the road wheel in its normal position of use upon a road surface is considered to lie in a vertical plane, with the axis of rotation of the wheel being horizontal and orthogonal to the direction of travel of the vehicle as the wheel rotates when the vehicle is travelling in a straight line longitudinal to the vehicle.

Each wheel carrier is operatively connected to the vehicle body by the suspension system. In general, any suspension system can be considered to comprise one or more links making up a linkage which controls movement of the wheel carrier relative to the body. The links may connect the wheel carrier directly to the vehicle body or to a subframe which is in turn attached to the vehicle body. Generally, the linkage is the portion of the suspension system that provides the majority of the travel of the wheel carrier relative to the body. The subframe may also allow a much more limited range of movement.

In order to provide a smooth ride for occupants of the vehicle and good body control during acceleration, braking and cornering, the suspension must fulfil several roles.

The first role of the suspension system is to isolate the vehicle body from road inputs. To perform successfully, this typically requires a "soft" suspension. However, the second role is to control the wheel relative to the body during braking, acceleration and cornering forces which demands a "hard" suspension for good control and rapid responses. Obviously, these two roles are conflicting when considered in such a broad brush manner. Designers have in the past believed it necessary to produce a compromise design depending on the intended function of the vehicle, i.e. sports or luxury vehicle.

One specific area of compromise, and which is the basis of the invention, relates to this stiffness of the suspension system, and specifically the deflection of the wheel (and more specifically the wheel carrier) under operating forces as controlled by the suspension system.

As set out hereinbefore, the suspension system can be thought of as the complete set of components linking the vehicle wheel to the vehicle body. This may include a subframe and a suspension sub-set comprising a number of links defining a linkage which allow the vast majority of wheel travel (mostly vertical displacement) to be achieved.

In a typical system the wheel carrier is attached to the suspension system using a wheel bearing that constrains all degrees of freedom of the wheel with respect to the suspension system with the exception of rotation about the bearing axis. In force terms, this means that the wheel can only impart a force on the suspension system that is either parallel to or passes through the bearing axis.

During motion of the vehicle in a straight line along an imperfect road, impact forces are created which are typically in the plane of the wheel and consist of varying combinations of longitudinal, lateral and vertical forces. These are applied to the suspension at the centre of the wheel due to the wheel bearing. In the main, reaction of the vertical forces is provided by a flexible linkage consisting of a spring/damper combination, whilst reaction of the longitudinal and lateral forces is provided by the suspension linkage which can be a rigid link since only limited travel is needed, or could be a flexible link.

It is now widely accepted that the lower the longitudinal stiffness of the suspension linkage (i.e. freedom to move backwards and forwards along direction of travel of vehicle), the lower the transmission of impact forces into the vehicle and hence the more refined the vehicle is.

As with the broad view of suspension design considered hereinbefore, selecting the longitudinal stiffness of the suspension system has, in the past, been thought to be a comprise between good road handling and comfort. The reason for this belief is that both braking and impact forces produce longitudinal displacement of the wheel carrier. Under braking, the location of the wheel carrier by the suspension is required to be longitudinally stiff to prevent loss of castor angle, yet for good impact absorption it should have a low stiffness longitudinally.

The applicants have appreciated that whilst both braking and impact absorption place broadly conflicting requirements on vehicle suspension longitudinal stiffness, the manner in which the displacement of the wheel carrier is produced due to braking and impact loads is different.

Under braking, with an outboard braking system acting between a wheel carrier and wheel 2, the braking system provides a torque reaction between the wheel and suspension links which the bearing normally prevents. This results in longitudinal forces BF acting at the location of the tyre contact patch 202 (in the same way as if a longitudinal force were applied to the tyre at the contact patch with the brake locked). However, for impact forces IF although a longitudinal displacement also occurs it is due to forces that act through the centre of the wheel carrier rather than of the contact patch. This can be seen in FIG. 1 of the accompanying drawings. The height of the vehicle also generates vertical forces VF acting through the wheel carrier.

The applicants thus propose to provide a suspension system that provides good performance under various longitudinal forces by taking into account the different nature of those longitudinal forces which act through either the contact patch or wheel centre. Such an approach to suspension system design has heretofore not been fully exploited by the skilled person in the art.

Suspension systems have been produced in which the contact patch longitudinal stiffness is greater than the wheel carrier longitudinal stiffness by suitable arrangement of the mounting for the vehicle subframe. An example is the suspension for the McLaren F1 motor car which employs a set of four subframe mounting bushes that are radially stiff and are focused on the wheel contact patch. A problem with such an approach is that the entire mass of the subframe must translate longitudinally during a deflection of an impact.

SUMMARY OF THE INVENTION

According to a first aspect, the invention provides a suspension system adapted to control movement of a wheel carrier relative to the body of a vehicle, the wheel carrier being adapted to support a wheel and tyre for rotation about the axis of a bearing carried by the wheel carrier, in which the suspension system comprises one or more links, each operatively connected at one end to the wheel carrier and at the opposite end operatively connected to the vehicle body, the disposition relative to said wheel carrier and said vehicle body of the or each link defining a linkage which allows movement of the wheel carrier relative to the vehicle body, the linkage being so constructed and arranged that the stiffness or reaction of the suspension to longitudinal forces applied at the wheel contact patch is greater than the stiffness or reaction of the suspension to longitudinal forces applied substantially at the axis of rotation of the wheel.

Preferably, the wheel carrier is adapted to support the wheel brake assembly which acts between the carrier and the wheel.

Thus, in accordance with the present invention, the geometry of the suspension linkage which provides the majority of the wheel travel is such as to achieve an improved suspension characteristic by reacting differently to the various types of longitudinal force that can be generated. This is inherently advantageous compared to the prior systems in which the subframe defines the axis, as less mass needs to move when absorbing an impact.

By majority of the wheel travel, we mean that the linkage may provide, in use, at least 80% or at least 90% of the vertical travel of the wheel carrier. The remainder may be provided by movement of a subframe to which the linkage is attached, or other play in the system.

By operatively connected to the vehicle body, we mean that one or more links may be attached directly to the vehicle body or attached to a subframe which is in turn attached to the vehicle body.

Preferably, the geometry of the suspension linkage defined by the links is arranged so that a shear axis of the suspension system passes through or substantially through the contact patch of the tyre of the road wheel attached to the wheel carrier. By a shear axis we mean the axis about which the wheel and carrier as a whole is permitted to rotate by the suspension linkages when subjected to a pure torque about that axis.

Preferably, the bearing is mounted onto the wheel carrier in such a way that it cannot move radially relative to the carrier and hence braking system.

Preferably, the shear axis is substantially horizontal. It may also be substantially lateral to the vehicle body.

Preferably, the or each link comprises a rigid link. The or each link may be pivotally connected to the wheel carrier and to the vehicle body. The pivotal connection may comprise a spherical joint or bush or a universal joint or any other mechanical connection. Each link may comprise a forged or pressed metal element, or may be a cast or otherwise produced.

This axis is hereinafter referred to as a longitudinal compliance shear axis or LCSA.

When the suspension links define an LCSA as above, the ratio of the longitudinal stiffness of the contact patch to the longitudinal stiffness at the wheel carrier axis of rotation will be dependent upon the perpendicular distance from the LCSA to the rotation axis of the wheel carrier compared to the perpendicular distance from the LCSA to the contact patch, as well as the ratio of torsional stiffness about the axis to translational stiffness through the axis at the contact patch. It is preferred that the geometry is selected to give as high a ratio as possible. A ratio of greater than 1:1, or at least 2:1, or at least 3:1, or at least 4:1 or perhaps at least 10:1 or 100:1 or higher can be achieved. The ratio may fall within a range of ratios bounded at its lower end by one of these ratios or lower and at its upper end by one of these ratios or higher also falls within the scope of the invention. For example, it may be between 2:1 and 3:1 or 3:1 and 4:1.

In a most preferred arrangement, the geometry of the links may be selected to provide a shear axis that is substantially in a horizontal plane and lateral. This results in a wheel deflection without significant toe or camber change when subjected to a longitudinal force.

In addition to the one or more links which define the geometry of the suspension linkage required to provide the correct shear axis, one or more further links may be provided which define the swing axis of the suspension system. By swing axis, which is a term well known in the art, we mean the axis about which the wheel carrier is permitted to rotate by the suspension links when subjected to a vertical load i.e. bump reaction.

Of course, by suitable selection of links defining the linkage it is possible to provide a set of links which define both the first shear axis (through or substantially through the contact patch) and the swing axis.

In one simple arrangement, four substantially rigid links are provided which are so arranged geometrically as to define both the shear axis and the swing arm axis of the suspension, each link being pivotally connected at a first end to the wheel carrier and at the opposite end to a part of the vehicle body or a subframe connected to the body.

The provision of a subframe can provide further refinement in isolating the wheel suspension from the vehicle body. Since the LCSA and swing axis are defined by the links, the designer of the subframe is free to concentrate on designing a subframe that eliminates vibration or other unwanted high frequency parameters.

In the proposed four link system, two of the links are connected to the wheel carrier above its axis of rotation. For simplicity, the wheel carrier may be considered to be a plate with the bearing defining its axis of rotation located at its centre. They meet the carrier on opposite sides of a centre line running radially upwards from the axis of rotation of the wheel carrier and are connected to the body (or subframe) in such a manner that the opposing ends are closer together than, and below the level of, the first ends. Thus, projecting a respective vector along a line joining each end of a link, the vectors will substantially cross at a point on the same side of the wheel carrier as the links and substantially in a longitudinal plane of the contact patch.

The remaining two links are similarly connected but their first ends are spaced apart below the level of the wheel carrier axis and the opposing ends are above and spaced further apart. Two vectors passing through the ends of respective along these links will therefore meet on the opposite side of the wheel carrier to the links and in the horizontal plane containing the contact patch. The LCSA axis is then defined as the axis that connects these two "crossing points" and will therefore pass through or substantially through the contact patch.

In such an arrangement, the swing arm axis can also be found by projecting vectors through the ends of the links until they all pass through the same axis.

The four rigid links define the two required axes of movement of the wheel carrier. To control movement of the wheel carrier about these axes two or more further links may be provided. Preferably, each of these links is a flexible link.

A first additional link may be provided which is adapted to react movement of the wheel carrier about the swing arm axis. This is hereinafter referred to as a control link and may comprise a spring and/or damper assembly which may be connected to the wheel carrier and the vehicle body. The spring and damper may be coaxial.

A second additional link may be provided which is adapted to react movement of the wheel carrier about the LCSA axis. This may be a substantially rigid link. Alternatively, it may incorporate damping.

It will of course, be understood that many other suspension linkage arrangements are possible which fall within the scope of the invention. Whilst it is not possible to list exhaustively all the possible arrangements, once the skilled man appreciates that the invention provides a shear axis that passes substantially through the contact patch by suitable selection of link geometry, to construct these alternative arrangements requires no more than routine laboratory experiment and not inventive skill.

In accordance with a second aspect, the invention provides a vehicle having one or more road wheel carriers and a passenger carrying vehicle body, the movement of the or each road wheel relative to the body being controlled by a suspension system in accordance with the first aspect of the invention.

There will now be described, by way of example only, one embodiment of the present invention with reference to the accompanying drawings of which:

DETAILED DESCRIPTION OF THE PREFERRED EMBODIMENT

Figure 1:
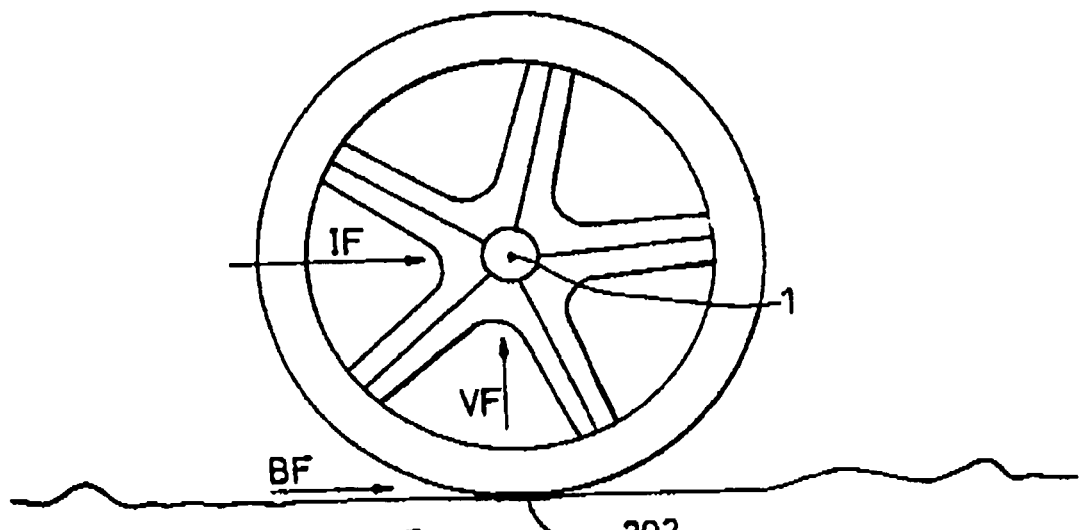
FIG. 1 illustrates the forces acting on the wheel carrier of a road wheel of a vehicle when viewed in elevation from the side of the vehicle.

The example of a suspension system in accordance with the present invention and illustrated in the accompanying drawings comprises a multi-link system consisting of rigid links and flexible links. The geometry of the rigid links defines a suspension linkage constraining the movement of the wheel carrier (and hence wheel) whilst the two flexible links provide reaction forces between the wheel carrier and the vehicle body which oppose movement of the wheel carrier.

Four rigid links 10, 20, 30, 40 are provided. Each rigid link 10, 20, 30, 40 is point connected to a wheel carrier 1 for a road wheel and tyre 2 at one end and to a part of the body 100a of a vehicle through a sub-frame 100b at the other end. Preferably, frictionless spherical bearings 101 are provided for these connections, or as near frictionless as possible. With a four link system with point-to-point rigid links as shown in FIGS. 2 to 5, two instantaneous axis of movement are exhibited, and by careful alignment of the links the suspension of the present invention achieves one such instantaneous axis (or LCSA) that passes through or almost through the contact patch of the tyre 2 on the road surface 200 when the vehicle is supported on the surface 200. The other axis comprises a swing arm axis about which the whole wheel carrier and wheel pivots when subjected to vertical loads (such as crossing bumps). Looked at one way, the suspension can thus be considered to allow two degrees of freedom in which resistance to movement of the wheel carrier relative to the body is lower than the resistance to movement about the remaining degrees of freedom.

Figure 2:
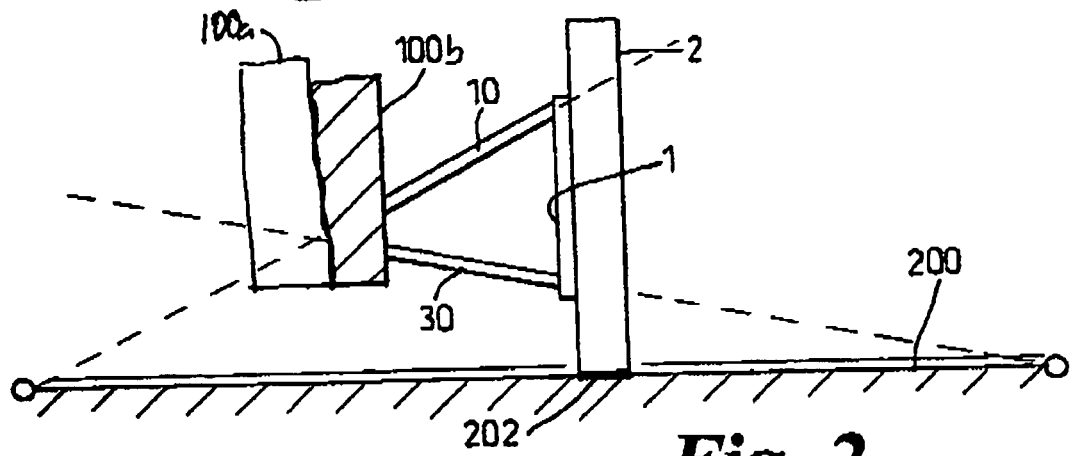
FIG. 2 illustrates a first embodiment of a suspension system in accordance with one aspect of the present invention when viewed in elevation from the front of the vehicle.

As shown in front view in FIG. 2 of the accompanying drawings, the four links 10, 20, 30, 40 support the wheel carrier 1 in a vertical plane, with a first (upper) pair of links 10, 20 connecting to the wheel carrier 1 above its central axis of rotation, and a second (lower) pair of links 30, 40 connecting to the wheel carrier 1 below its central axis of rotation. As shown in front view in FIG. 2 of the accompanying drawings, the four links 10, 20, 30, 40 support the wheel carrier 1 in a vertical plane, with a first (upper) pair of links 10, 20 connecting to the wheel carrier 1 above its central axis of rotation, and a second (lower) pair of links 30, 40 connecting to the wheel carrier 1 below its central axis of rotation. The two upper links 10, 20 connect to the vehicle body 100a through a sub-frame 100b at a height below that at which they connect to the wheel carrier (i.e. inclined from the horizontal). The two lower links 30, 40 connect to the vehicle body 100a through a sub-frame 100b at a height above that at which they connect to the wheel carrier.

Figure 3:
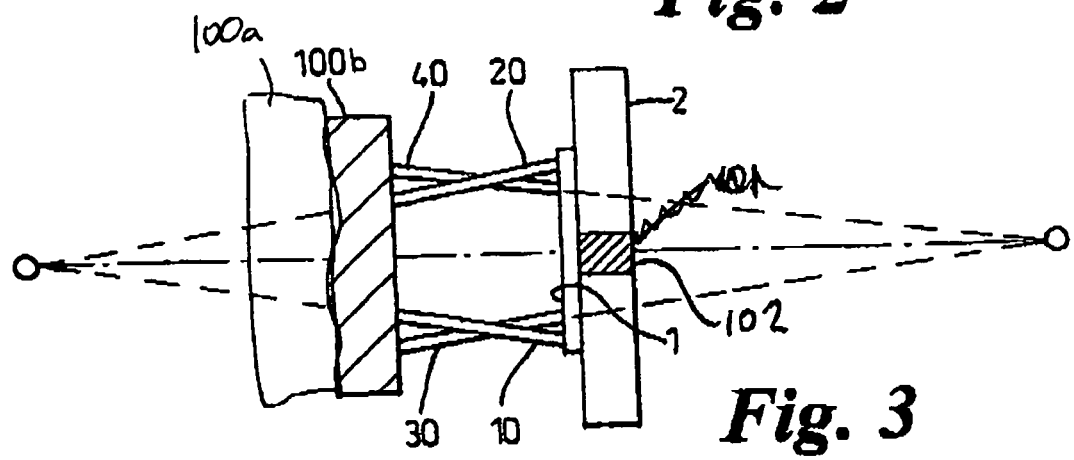
FIG. 3 corresponds to the system of FIG. 2 but viewed from directly above.

FIG. 3 shows the arrangement of the suspension links when viewed from above the wheel carrier 1. The two upper links 10, 20 connect to the wheel carrier 1 spaced apart either side of a vertical line dropped through the wheel carrier 1 axis of rotation. Similarly, the two lower links 30, 40 are also spaced equally about the axis where they connect to the wheel carrier 1, but by a smaller distance than the upper links. FIG. 3 also shows a bearing 102 by means of which the tire rotatably engages the wheel carrier 1. The bearing 102 is mounted onto the wheel carrier 1 such that it cannot be moved radially relative to the wheel carrier 1.

Both pairs of links 10, 20, 30, 40 connect to the vehicle body in a spaced arrangement. The lower links 30, 40 are spaced apart horizontally more than at the wheel carrier (i.e. the links 30, 40 taper outwards away from the wheel carrier) whilst the upper links 10, 20 taper inwards towards the vehicle body 100a and are spaced apart by a smaller distance than at the wheel carrier.

Figure 4:
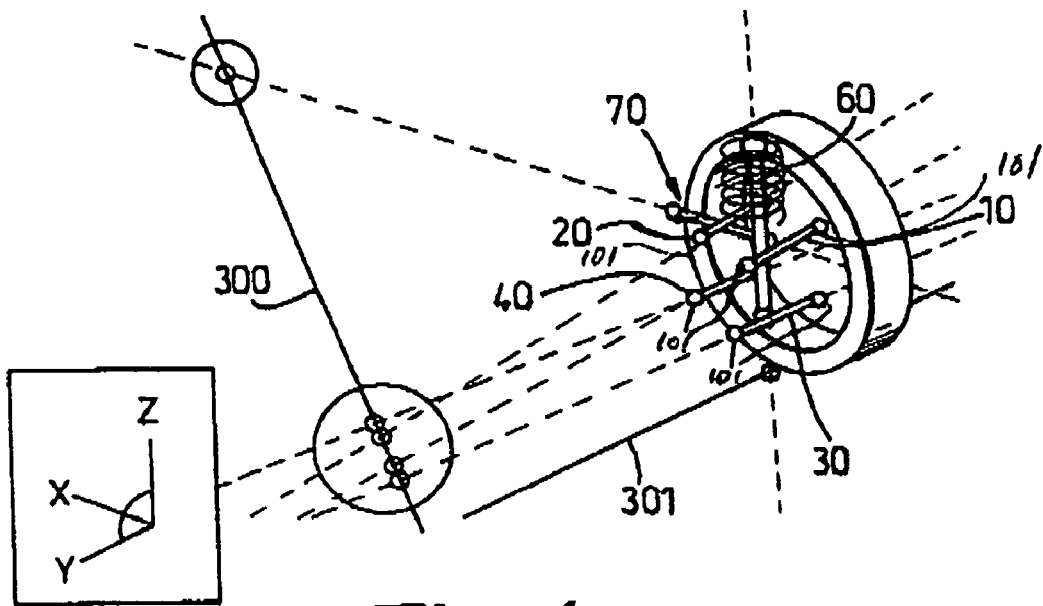
FIGS. 4 and 5 are isometric views of the suspension system of FIGS. 2 and 3 illustrating how the two shear axes of the system can be calculated by projecting vectors connecting the ends of the suspension links.
Figure 5:
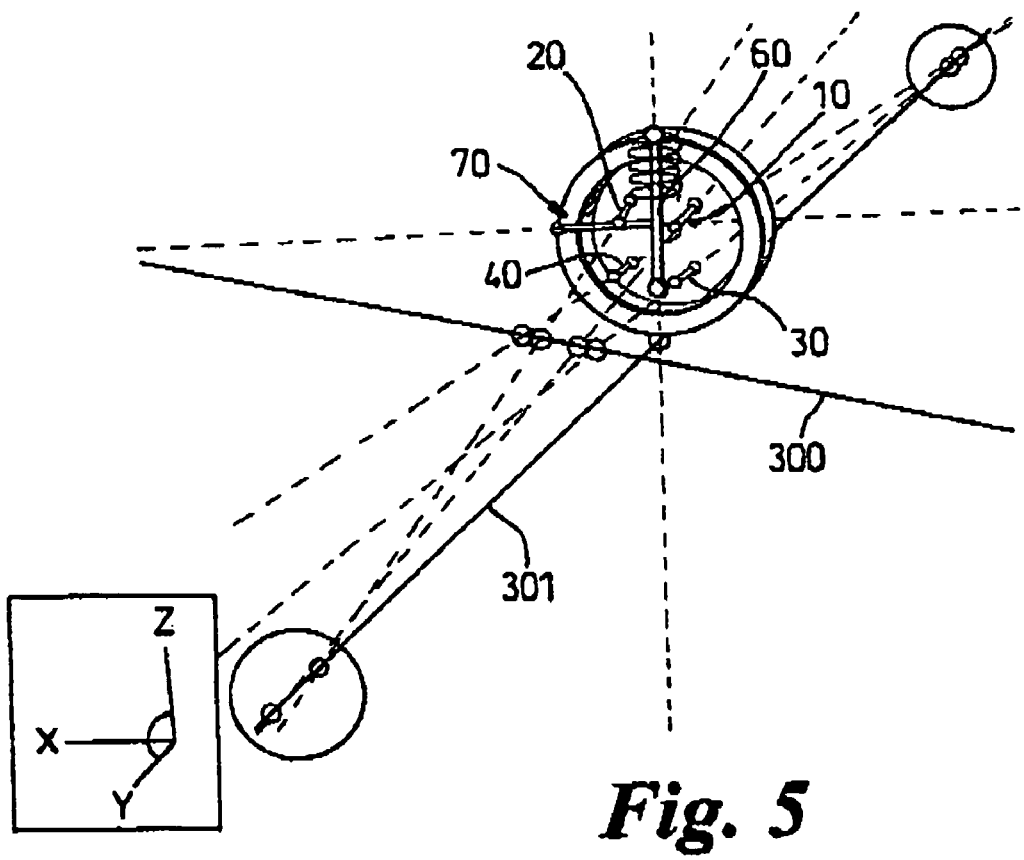

FIGS. 4 and 5 illustrate how the swing arm axis 300 and shear axis 301 can be calculated for this arrangement, and also the possible location of two flexible links which restrain movement about these axes.

The two axes are found by projecting imaginary lead lines or vectors along the axes of each link as shown. Each vector passes through the end points of each respective link.

Movement of the wheel carrier 1 about the swing arm axis is "controlled" by a damper and road spring 60 oriented substantially vertical (or parallel to the direction of motion at its attachment). A longitudinal movement of the wheel carrier is reacted by a restorative force applied to it by a substantially longitudinal link 70 which has a vector which passes through the swing arm axis so as to ensure minimal movement of the system about the shear axes as the suspension circulates about the swing arm axis. It is also important in this example that the vector of this link does not pass through the shear axis so that it provides a reaction to movement about the shear axis.

In another refinement, the road spring vector is arranged to pass through the shear axis.

Arranging the links in this manner, a longitudinal force at the contact patch will be reacted by the two pairs of links only and no deflection of the wheel is permitted. However, a longitudinal force at the wheel carrier centre will be mainly reacted by the complaint longitudinal link with some additional reaction by the two pairs of links so that the wheel centre can deflect improving ride quality.

The invention claimed is:

1. A suspension system for controlling the movement of a wheel carrier relative to a body of a vehicle, said wheel carrier supporting a wheel and tire for rotation about an axis of a bearing carried by said wheel carrier, said tire engaging a road surface at a tire contact patch, wherein said suspension system comprises one or more links having a first end and a second end, each of said one or more links being operatively connected at said first end to said wheel carrier and at said second end operatively connected to said vehicle body, and wherein said one or more links are disposed relative to said wheel carrier and said vehicle body so as to define a linkage which controls movement of said wheel carrier relative to said vehicle body, and wherein said one or more links of said linkage are arranged geometrically to define both a shear axis and a swing arm axis of said suspension system such that the stiffness of said suspension system to longitudinal forces applied at said tire contact patch is greater than the stiffness of said suspension system to longitudinal forces applied substantially at said axis of rotation of said wheel.

2. A suspension system according to claim 1, wherein each of said one or more links is solid and is connected at said first end to said wheel carrier and at said second end to a part of said vehicle body.

3. A suspension system according to claim 1, wherein said linkage comprises four rigid links.

4. A suspension system according to claim 1, wherein said linkage provides, in use, at least 80% of the vertical travel of said wheel carrier.

5. A suspension system according to claim 1, wherein at least one of said one or more links is attached directly to said vehicle body.

6. A suspension system according to claim 1, wherein at least one of said one or more links is attached to a sub-frame which is in turn attached to said vehicle body.

7. A suspension system according to claim 1, wherein said wheel bearing is mounted onto said wheel carrier such that it cannot move radially relative to said wheel carrier.

8. A suspension system according to claim 1, wherein said suspension linkage defined by said one or more links is arranged so that said shear axis of said suspension system passes substantially through said tire contact patch.

9. A suspension system according to claim 8, wherein said shear axis is substantially horizontal.

10. A suspension system according to claim 8, wherein said shear axis is substantially lateral to said vehicle body.

11. A suspension system according to claim 1, wherein each of said one or more links comprises a rigid link.

12. A suspension system according to claim 1, wherein said one or more links are pivotally connected to said wheel carrier and to said vehicle body.

13. A suspension system according to claim 1, wherein the ratio of the longitudinal stiffness of said system at said tire contact patch to the longitudinal stiffness of said system at said wheel axis of rotation is greater than 2:1.

14. A suspension system according to claim 1, which further includes one or more additional links which, together with said linkage, define said swing arm axis of said suspension system.

* * * * *